(No Model.)

C. T. HOLLOWAY.
VELOCIPEDE.

No. 274,196. Patented Mar. 20, 1883.

Witnesses:
A. E. Eader
John E. Morris

Inventor:
Chas. T. Holloway
By Chas. B. Mann
Attorney

UNITED STATES PATENT OFFICE.

CHARLES T. HOLLOWAY, OF BALTIMORE, MARYLAND.

VELOCIPEDE.

SPECIFICATION forming part of Letters Patent No. 274,196, dated March 20, 1883.

Application filed January 26, 1883. (No model.)

*To all whom it may concern:*

Be it known that I, CHARLES T. HOLLOWAY, a citizen of the United States, residing at Baltimore, in the State of Maryland, have invented certain new and useful Improvements in Velocipedes, of which the following is a specification, reference being had therein to the accompanying drawings.

My invention relates to certain improvements in velocipedes, and the same will first be described, and then designated in the claims.

Figure 4:
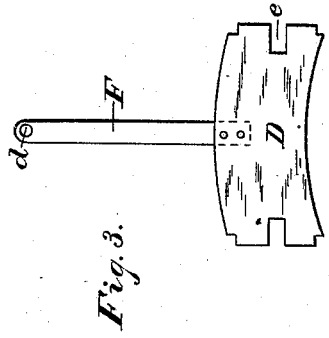
Figure 3:
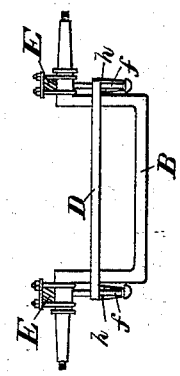
Figure 5:
Figure 1:
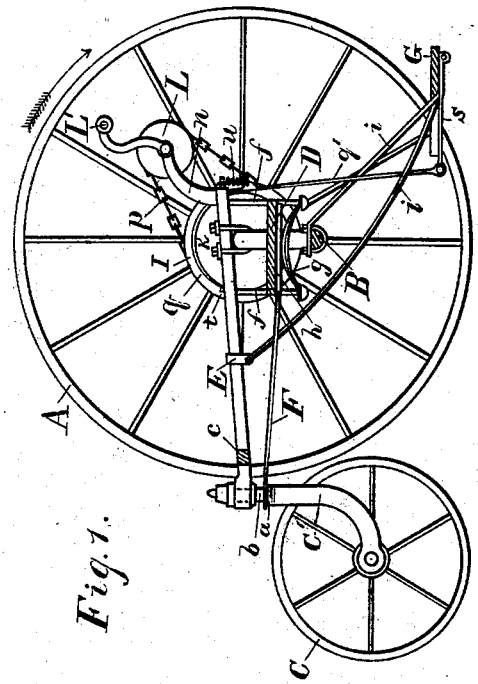
Figure 2:
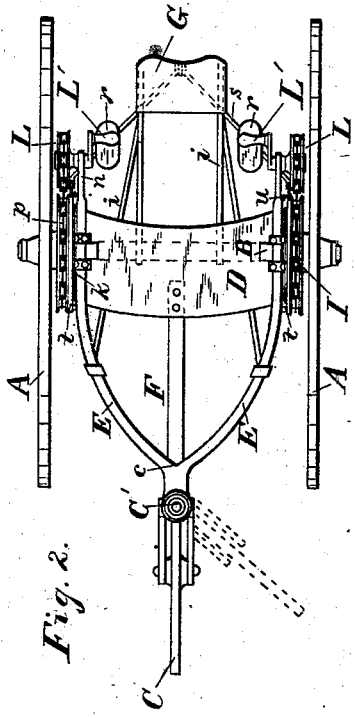

In the drawings hereto annexed, Figure 1 is an elevation, the seat and axle being in section. Fig. 2 is a plan view. Fig. 3 is a top view of the seat and spring F. Fig. 4 is a front view of the axle and seat. Fig. 5 is a view of the drive-pulley.

The letter A designates the two side wheels, which are designed to be very large; B, the downward-bent axle, and C the rear wheel. The downward bend in the axle permits the seat D to be suspended below the axis of the wheels. The rear wheel, C, is a following wheel, and has nothing to do with guiding the velocipede. It serves to support the vehicle from tilting back and gives it stability or a firm set on the ground. The lower end of the turn-post C', which is bifurcated to set astride of the wheel, is curved to facilitate the wheel following, and above the bifurcated part is a shoulder, a, at the base of the pivot b, which latter projects upward from the shoulder. Above each end of the axle an iron, E, is attached, and both irons extend back and curve inward toward each other and join at c. From the point of joinder rearward this iron has increased thickness, and serves as the bearing-block for the pivot b of the rear wheel. A flat plate-spring, F, has one end bolted to the seat D, and the other end rests upon the shoulder a of the turn-post, a hole, d, in the plate providing for the pivot b. The position of the seat is such with respect to the axle that the largest part of the weight of a person occupying the seat is to the rearward of the axle, and consequently a part of this weight is supported by the rear wheel. This weight comes on the spring F, which therefore serves to prevent any jar on the seat when the small rear wheel is passing over a rough pavement. Two hanger-rods, f, depend from each of the irons E, one of them being on each side of the axle. A half-elliptic spring, g, has one end supported by each hanger-rod, and a bolster-bar, h, rests on the spring. Each end of this bar has an open slot to adapt it to partly fit about the hanger-rod. The ends of the seat D have a slot, e, which adapts it to fit about the downward-bent part of the axle, and the seat rests upon the bolster-bar. The seat may have a suitable back. A foot-rest, G, is supported by rods i. The hub of each side wheel is provided with a pulley, I, adapted for a drive-chain, and each of these pulleys has on the side a face, k, for the application of a brake-shoe. A standard, n, is supported by the iron E and carries a crank-pulley, L. A chain, p, passes over the pulleys I and L, and a hand-crank, L', enables the rider occupying the seat to drive the velocipede. A brake-shoe or steel band, q, rests on the upper side of the face k, and a rod, q', depends below. A foot-pedal, r, is supported on a rod, s, which has one end pivoted under the foot-rest G and the other end connected to the rod q'. One end of the band q, which in this instance constitutes the brake-shoe, is attached to a lug, t, at the side of the backward-extending iron E. From the lug the band extends forward and down over the brake-face k. Just past the point where the band has bearing on the face the band connects with the rod q', which by preference is stiff. A spiral spring, u, has its upper end attached to the iron E and its lower end to the rod q'. The tendency of this spring is to lift the rod, and thereby to raise the brake-band q up and prevent it from bearing on the brake-face k. By pressing the foot on the pedal the brake-shoe is applied to the face k. A brake of this construction is provided for each side wheel, and both brakes at once, or one only, may be applied. This construction of brake enables it to serve in a secondary capacity as a guide.

The rider may control the movement of the velocipede wholly by the hand-cranks. By holding one crank immovable and turning the other, one wheel will act as a pivot while the other turns about it in a circle.

Having described my invention, I claim—

1. In a three-wheeled velocipede, the combination, with the pivot of the follow-wheel, of the seat, and a plate-spring, F, having one end secured to the seat, and the other end adapted to rest on the shoulder at the base of the pivot, and provided with a hole, $d$, in which the pivot turns, as set forth.

2. In a velocipede, the combination of the side wheels, each provided with a drive-chain pulley, I, secured on the hub, axle B, an iron, E, attached above each arm of the axle, and extending back to the follow-wheel, standard $n$, supported at the front end of said iron, and carrying a drive-chain crank-pulley, chain $p$, and hand-crank, as set forth.

3. In a three-wheeled velocipede, the combination of a downward-bent axle, an iron, E, attached above each arm of the axle, two hanger-rods, $f$, depending from each of the said irons, a spring supported by the hanger-rods, and a suspended seat, D, supported by the spring, as set forth.

4. In a three-wheeled velocipede, the combination of the side wheels, each provided on its hub with a brake-face, $k$, the foot-rest G, a brake shoe or band, $q$, adapted to rest on the face, and having a rod to depend below, and a pedal-rod, $s$, having one end pivoted on the foot-rest, and the other end connected to the brake-shoe rod, as set forth.

In testimony whereof I affix my signature in presence of two witnesses.

CHARLES T. HOLLOWAY.

Witnesses:
R. ROSS HOLLOWAY,
W. S. WILKINSON.